April 3, 1951 R. H. DICKE 2,547,378

RADIO FREQUENCY MIXER

Filed March 22, 1945

INVENTOR.
ROBERT H. DICKE

BY William D. Hall

ATTORNEY

Patented Apr. 3, 1951 2,547,378

UNITED STATES PATENT OFFICE 2,547,378

RADIO-FREQUENCY MIXER

Robert H. Dicke, Cambridge, Mass., assignor, by mesne assignments, to the United States of America as represented by the Secretary of War Application March 22, 1945, Serial No. 584,226

1 Claim. (Cl. 250—20)

This invention relates to electrical systems and more particularly to electrical systems in which the frequencies of various energies are combined in novel combinations.

According to conventional theory certain elements, including vacuum tubes, silicon crystals and other devices possessing non-linear electrical characteristics, may be used as frequency changers. These frequency changers are also referred to as mixers. When energy consisting of two different frequencies is impressed across such an element and a load, energy of several different frequencies will appear across the load. Included will be energy of a frequency equal to the difference of the two impressed frequencies. In radio work this difference frequency is often referred to as the intermediate frequency. In normal radio work the two impressed frequencies come from a local oscillator and radio frequency signal source. In the case where very high gain receivers are used noise originating in the initial stages of the receiver is a matter of prime importance. Much of this noise may originate in the local oscillator. This is true when the energy from the local oscillator is of more than one frequency. Frequencies present other than the fundamental may combine with the fundamental in the mixer and therein produce undesired noise at the same intermediate frequency as would be produced by energy from the signal source and the local oscillator.

An object of this invention, therefore, is to provide apparatus for combining two sources of energy in a manner such that the intermediate frequency energy output does not have components due to the combination of energy of two frequencies from one of the energy sources.

In accordance with the present invention there is provided a device having two frequency changing means or mixers. There are two sources of radio frequency energy, one or both of which contains noise which it is desired to eliminate. One of the sources of radio frequency energy is coupled to the frequency changing means or mixers so that energy from this source will arrive at the two mixers in phase. The remaining radio frequency energy source is coupled to the two mixers so that energy from this source will arrive at the two mixers in 180° phase opposition. Two coupling means are provided for deriving the end product produced by the two sources of radio frequency energy and the frequency changing means.

For a better understanding of the invention, together with other and further objects thereof, reference is had to the following description taken in connection with the accompanying drawings, and the scope of the invention will be pointed out in the appended claim.

Figure 1:
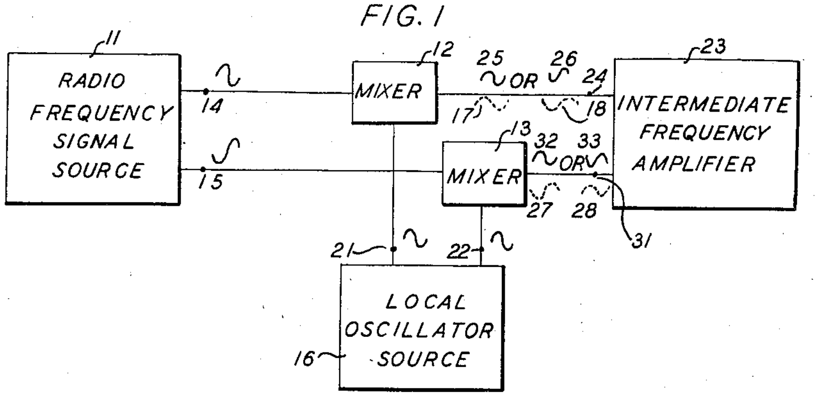
Fig. 1 shows a block diagram of one embodiment of the invention.

Referring now more particularly to Fig. 1 of the drawings, there is shown a balanced mixer. This mixer may be a vacuum tube, crystal or other frequency changing device. A radio frequency signal source 11 is adapted to feed mixers 12 and 13. The mixers 12 and 13 are fed from this radio frequency source 11 in 180° phase opposition as shown by the waveforms at 14 and 15. A local oscillator source 16 feeds the mixers 12 and 13 also, but in phase, as illustrated by the waveforms at 21 and 22. The mixers 12 and 13 will function equally well if the signal source 11 feeds the mixers 12 and 13 in phase and the local source 16 feeds the mixers 12 and 13 in 180° phase opposition. The mixers 12 and 13 have their outputs combined to feed an intermediate amplifier 23. This is the normal position of intermediate frequency amplifiers in systems of the type being described. The mixer 12 fed by energies from points 14 and 21 will produce intermediate frequency energy at 24 with the phase illustrated by waveform 25 or 26 depending upon the manner in which the mixer is connected to operate. Likewise mixer 13 will produce an output at 31 with the phase illustrated by waveform 32 or 33 depending upon the manner in which the mixer is connected to operate. The intermediate frequency energy outputs at 24 and 31 may be combined directly, i. e. added, in a manner well known in the art when the mixers 12 and 13 are so connected that the phase relationship of their outputs are as indicated by waveforms 25 and 32. If the connections of both mixers 12 and 13 are reversed so that the phase relationship of their outputs are shown by waveforms 26 and 33 the ouputs may also be combined directly. The intermediate frequency energy outputs at 24 and 31 may be combined in push-pull if the phase relationship between the two outputs is 180°. The condition for push-pull operation will be satisfied if the mixers 12 and 13 are connected so that the phase relationship of their outputs are as represented by waveforms 25 and 33 or by waveforms 26 and 32. Any undesired output, such as noise, which appears at 24 and 31 but which is due to the combination of energy of two frequencies which originate solely in one of the two sources will be cancelled out when the outputs 24 and 31 are combined. When the mixer 12 is connected to produce an output having waveform 25 or 26 the noise output will have waveform 17 or 18 respectively. When the mixer 13 is connected to produce an output having waveform 32 or 33 the noise output will have waveform 27 or 28 respectively. It will be noted that if we combine directly the outputs at 24 and 31 when their phase relationship is represented by waveforms 25 and 32 the associated noise waveforms 17 and 27 will have a phase relationship such that they will cancel each other. A similar statement holds if the phase relationships are as shown in waveforms 26 and 33. It will also be noted that if we combine the outputs at 24 and 31 in push-pull when their phase relationship is represented by waveforms 25 and 33 the associated noise waveforms 17 and 28 have a phase relationship such that in any push-pull system they will cancel each other. A similar statement holds if the phase relationships are as shown in waveforms 26 and 32.

Figure 2:
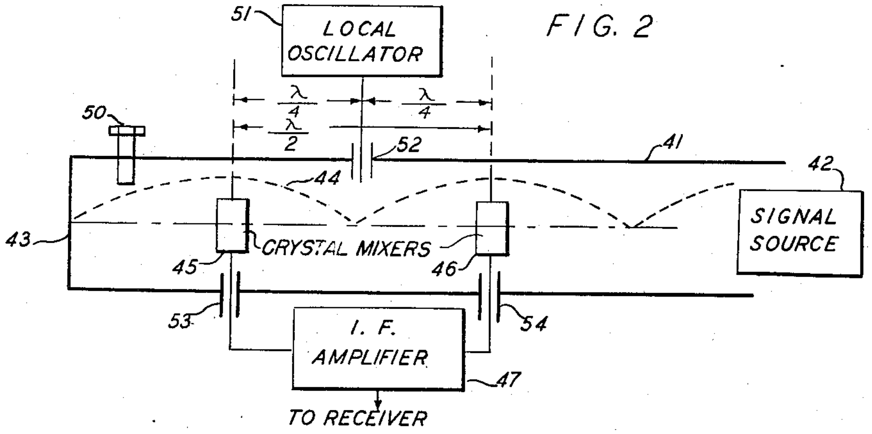
Fig. 2 shows an embodiment of the invention in a wave guide circuit.

Referring now more particularly to Fig. 2, there is shown an embodiment of the balanced mixer of Fig. 1 in a wave guide circuit. Radio frequency energy enters wave guide 41 from a source 42. This energy will strike the termination 43, which in the case shown is a short circuit, and standing waves illustrated by the dotted line marked 44 will be set up within the wave guide. Frequency changing means or mixers 45 and 46, preferably crystal mixers, are placed within the wave guide in a manner well known in the art and are separated by an electrical distance equal to an odd number of electrical half-wavelengths. In Fig. 2 the mixers 45 and 46 are separated by one-half wavelength. A tuning screw 50 is inserted into wave guide 41, intermediate termination 43 and the mixer 45 for adjusting the position of the standing waves in the guide 41. By means of the screw the standing waves 44 may be adjusted so that they are maximum in the positions of the mixers 45 and 46. Energy from a local oscillator source at 51 feeds into wave guide 41 at 52 such that it reaches mixers 45 and 46 in phase. In Fig. 2 the two electrical distances from 52 to each of the mixers 45 and 46 are equal to one-quarter wavelength. Energy of intermediate frequency is supplied by the apparatus shown in Fig. 2 at outputs 53 and 54. These outputs 53 and 54 may be combined in phase or in push-pull, as described in connection with the discussion of Fig. 1, depending upon the manner in which the mixers 45 and 46 are connected. The outputs 53 and 54 are shown connected to an intermediate frequency amplifier 47. The operational details other than those which have been described are well known in the art. The discussion of noise cancellation relating to the apparatus shown in Fig. 1 also applies to the apparatus shown in Fig. 2.

Figure 3:
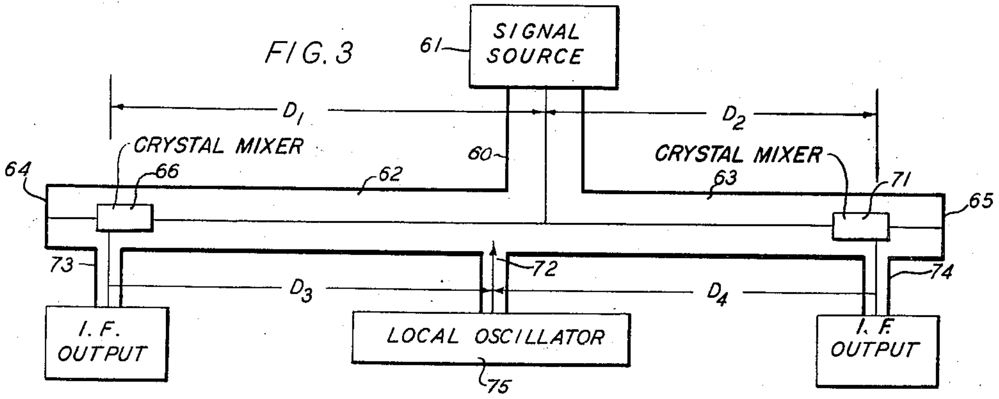
Fig. 3 shows an embodiment of the invention in a coaxial line circuit.

Referring now to Fig. 3, there is shown an embodiment on the balanced mixer of Fig. 1 in coaxial line circuit. Radio frequency signal energy from signal source 61 enters coaxial coupling line 60 and goes into two coaxial line branches 62 and 63. In Fig. 3 line branches 62 and 63 are terminated in short circuits 64 and 65 which set up standing waves in the line. Other terminations could be used but present practices favor the termination illustrated. In some cases the position of the termination may be adjustable by means of a plunger not shown so that the position of the standing waves may be shifted. Frequency changing means or mixers 66 and 71, preferably crystal mixers, are placed within the coaxial lines 62 and 63 in a manner well known in the art and are positioned so that the energy from line 61 arrives at the two mixers in 180° phase opposition. This is accomplished when $D_1$ exceeds $D_2$ by an odd number of electrical half wavelengths, $D_1$ being the distance from mixer 66 to signal source channel 61 and $D_2$ being the distance from mixer 71 to the signal source channel 61. Energy from a local oscillator 75 is inserted in lines 62 and 63 by means of a probe 72 or other means well known in the art. The insertion is made in such a manner that energy from the local oscillator arrives at the two mixers 66 and 71 in phase. This is accomplished when $D_3$, the distance from the mixer 66 to the probe 72, and $D_4$, the distance from mixer 71 to the probe 72, are equal to each other or the difference between them is an integral number of wavelengths. Integral number is assumed to include zero. The apparatus shown in Fig. 3 will function equally well if the signal energy arrives at the mixer in phase and the energy from the local source arrives at the mixers in 180° phase opposition. The intermediate frequency energy from the mixers 66 and 71 is supplied to outputs 73 and 74. The mixers 66 and 71 may be arranged in a manner described for Fig. 1 to have outputs 73 and 74 either in phase or in push-pull. The discussion of noise cancellation given for Fig. 1 also applies to the apparatus shown in Fig. 3.

While there has been described what is at present considered the preferred embodiments of the invention, it is obvious to those skilled in the art that various changes and modifications may be made therein without departing from the invention, and it is, therefore, aimed in the appended claim to cover all such changes and modifications as fall within the true spirit and scope of the invention.

I claim:

A balanced mixer comprising a wave guide for maintaining standing waves of electromagnetic energy signals and having an input end and a short circuited end, means to impress a first frequency signal upon said input end, a pair of crystal frequency mixers disposed within said wave guide, said mixers having their inputs spaced an odd number of the first signal half wavelengths from each other whereby the first signal arrives at said inputs in phase opposition, means to adjust the position of the standing waves within said wave guide located at said short circuited end whereby said standing waves will be a maximum at said mixer inputs, means to impress a second frequency signal at the midpoint between said mixer inputs whereby said second frequency signal arrives in the same phase at both said mixer inputs, means to derive a difference frequency of said first and second frequency signals from the output of each of said frequency mixers, and means to combine the difference frequency outputs of said mixers to derive a resultant signal.

ROBERT H. DICKE.

REFERENCES CITED

The following references are of record in the file of this patent:

UNITED STATES PATENTS

| Number | Name | Date |
|---|---|---|
| 2,211,003 | Conklin | Aug. 13, 1940 |
| 2,296,107 | Kimball | Sept. 15, 1942 |
| 2,382,693 | Dallenbach et al. | Aug. 14, 1945 |
| 2,408,420 | Ginzton | Oct. 1, 1946 |
| 2,410,122 | Mercer | Oct. 29, 1946 |
| 2,413,939 | Benware | Jan. 7, 1947 |
| 2,420,892 | McClellan | May 20, 1947 |
| 2,469,222 | Atwood | May 3, 1949 |